Oct. 10, 1939.  J. FRIEDMAN  2,175,344
MASSAGE COMB
Filed Feb. 18, 1939
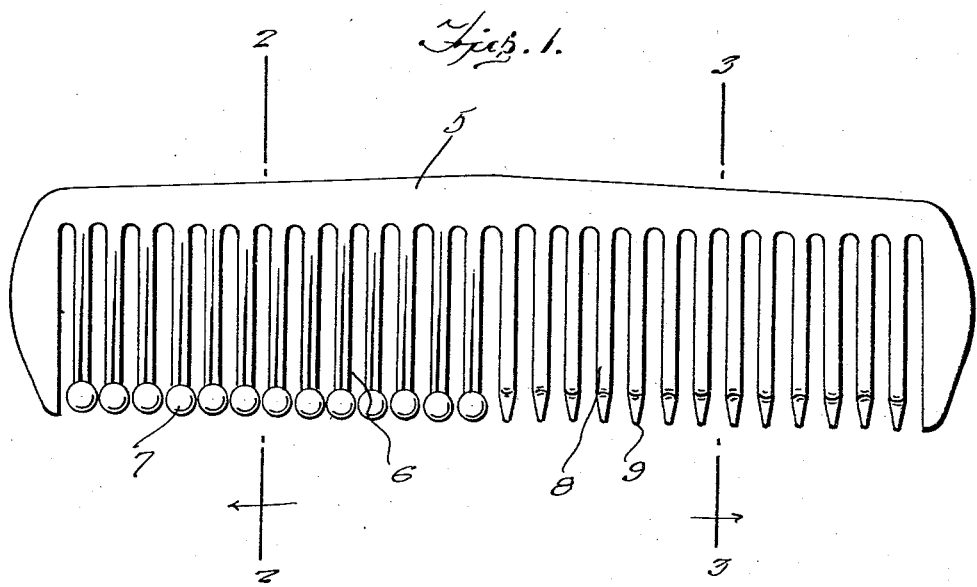
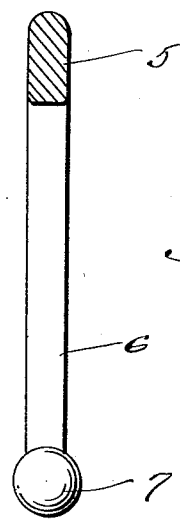
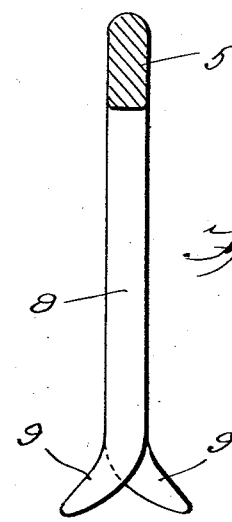
Inventor
J. Friedman
By Clarence A. O'Brien
and Hyman Berman
Attorneys Patented Oct. 10, 1939

2,175,344

UNITED STATES PATENT OFFICE 2,175,344

MASSAGE COMB

Joseph Friedman, York, Pa.

Application February 18, 1939, Serial No. 257,252

4 Claims. (Cl. 132—18)

The present invention relates to combs and has for its primary object to provide novel construction for the teeth of the comb by means of which the scalp may be massaged.

A further object of the invention is to provide a comb embodying a group of teeth having massaging heads at the ends thereof and also embodying a group of teeth having their points oppositely inclined for the purpose of loosening dandruff and removing the same from the hair.

A still further object is to provide an article of this character of simple and practical construction, which is efficient in performance, relatively inexpensive to manufacture and otherwise well adapted for the purposes for which the same is intended.

Other objects and advantages reside in the details of construction as more fully hereinafter described and claimed, reference being had to the accompanying drawing forming part hereof, wherein like numerals refer to like parts throughout, and in which:

Figure 1 is a side elevational view, and

Figures 2 and 3 are vertical sectional views taken respectively on the lines 2—2 and 3—3 of Figure 1.

Referring now to the drawing in detail, the numeral 5 designates the comb which includes a group of teeth 6 having balls or knobs 7 formed on the ends thereof.

The remaining teeth designated at 8 have their ends bent angularly as shown at 9 and of substantially tapering form, each alternate tooth being oppositely bent toward opposite sides of the comb, as clearly shown in Figure 3 of the drawing.

The comb is designed for the hygienic purpose of massaging and stimulating the scalp through the use of the knobs 7 on the teeth 6, while the inclined pointed ends 9 of the teeth 8 are designed for loosening dandruff and removing the same from the hair.

The comb is also of particular use for removing tangles from the hair.

It is believed the details of construction will be readily understood from the foregoing, without further detailed explanation.

Having thus described the invention, what I claim is—

1. A comb comprising a plurality of teeth and including a group of teeth having rounded heads formed on the ends thereof and also including a group of teeth arranged with the end portions of alternate teeth inclined in opposite directions toward opposite sides of the comb.

2. A comb comprising a plurality of teeth at one end of the comb having rounded enlarged heads and a plurality of teeth at the other end of the comb having tapered ends, said last named teeth being alternately arranged with their end portions inclined in opposite directions toward opposite sides of the comb.

3. A comb including a plurality of teeth having the end portions of alternate teeth inclined toward opposite sides of the comb.

4. A comb including a plurality of alternately arranged teeth extending toward opposite sides of the comb.

JOSEPH FRIEDMAN.